United States Patent [19]

McHugh

[11] Patent Number: 5,042,616
[45] Date of Patent: Aug. 27, 1991

[54] SELF-REGULATING LUBRICANT SUPPLY FOR THRUST BEARINGS

[75] Inventor: James D. McHugh, Schenectady, N.Y.

[73] Assignee: General Electric Company, Schenectady, N.Y.

[21] Appl. No.: 512,024

[22] Filed: Apr. 16, 1990

Related U.S. Application Data

[63] Continuation of Ser. No. 226,113, Jul. 29, 1988, abandoned.

[51] Int. Cl.[5] ............................................. F01M 1/00
[52] U.S. Cl. .................................... 184/6.11; 384/121
[58] Field of Search ............... 184/6.11; 384/121, 122, 384/123, 322, 368, 369, 399, 606

[56] References Cited

U.S. PATENT DOCUMENTS

| | | | |
|---|---|---|---|
| 2,449,297 | 9/1948 | Hoffer | 384/123 |
| 2,523,310 | 9/1950 | Kirkpatrick | 384/121 |
| 3,062,593 | 11/1962 | Royle | 384/121 |
| 3,146,037 | 8/1964 | Hooker | 384/121 |
| 3,635,533 | 1/1972 | Galloway | 384/121 |
| 4,215,903 | 8/1980 | Andrews | 384/399 |

Primary Examiner—Louis J. Casaregola
Assistant Examiner—Timothy S. Thorpe
Attorney, Agent, or Firm—Nixon & Vanderhye

[57] ABSTRACT

In a rotating shaft machine, the rotating shaft is usually equipped with a thrust collar which cooperates with stationary thrust bearings on either side of the thrust collar to prevent excessive axial movement of the rotating shaft. Lubrication is furnished to each bearing to protect the bearing as the shaft migrates toward that bearing. Prior art lubrication systems provided either equal amounts of lubrication fluid to equal sized bearings or a lesser amount of lubrication fluid to a smaller thrust bearing. It has been discovered that the total flow requirement for lubrication fluid can be reduced by using a lubrication fluid distribution means which tracks the position of the thrust collar and provides lubrication in response to the position of the thrust collar relative to the thrust bearings.

18 Claims, 4 Drawing Sheets

SELF-REGULATING LUBRICANT SUPPLY FOR THRUST BEARINGS

This is a continuation of application Ser. No. 07/226,113, filed July 29, 1988, now abandoned.

BACKGROUND OF THE INVENTION

This invention relates in general to lubricant supply systems for thrust bearings of the type used in large rotating shaft machines; and, in particular, to means responsive to axial thrust within the machine which apportion the lubricant supply to either an active or inactive bearing.

Rotating shaft machines such as turbines include stationary thrust bearings for preventing excess axial movement of the rotating shaft. The rotating shaft has a thrust collar which is rotatable with the shaft and which is positioned axially between an "active" and an "inactive" thrust bearing. Lubricating fluid is sent to both bearings to provide a lubrication film on the face of each thrust bearing which then supports the thrust collar as the shaft moves in either axial direction. The "active" thrust bearing is the bearing expected to ordinarily carry the higher loads most of the time whereas the "inactive" bearing would carry loads part of the time.

The problem which the present invention solves is to minimize the total lubricant flow rate to the two thrust bearings while still providing for a variety of operating conditions which may cause the normally inactive thrust bearing to become loaded.

In the prior art, it is a common practice in turbomachinery thrust bearing design to establish the size of the required normally active thrust bearing based upon some assumed steady-state operating condition of the machine. Axial thrust forces acting upon various components of a rotor are estimated, including, for example; the blades, wheel disks etc. and a net axial thrust is determined for this steady-state condition. The net axial thrust is typically the small difference between two large values thrusting the rotor in the fore and aft directions. It is well known to designers that this net axial thrust calculation may be subject to considerable error. Nevertheless, the normally active thrust bearing is generally sized based upon such a calculation of net thrust load and the allowable load per square inch of thrust bearing area. The lubricant flow rate to this normally active bearing is then established from considerations of its size, load and rubbing velocity.

In the design of heavy duty gas turbines, it is a usual practice to provide a normally inactive bearing smaller than the normally active bearing based upon the presumption that the inactive thrust will not exceed 50 percent of the design point active thrust load. The inactive thrust bearing size and the required flow rates are therefore based upon this premise. A total flow to the thrust bearings is supplied based upon the needs of the full-size active thrust bearing and the reduced capacity of the inactive thrust bearing. The usual thrust bearing lubricant supply arrangement includes a common header which supplies a journal bearing and two thrust bearings. The flow rate to each of the thrust bearings is controlled by different size orifices or drilled holes in the castings through which the lubricant must pass from the inlet header.

The design assumption for sizing the inactive thrust bearing does result in the benefits of reduced lubricant flow. Under certain conditions, however, the lubricant supplied to the inactive bearing may be inadequate or marginal for the imposed thrust load. As previously noted, the calculation of net thrust load is inherently subject to error even at the machine design point condition. Under off-design machine operation, or under transient machine operation, or with the wear of some critical components, it is possible for the normally inactive bearing to become subject to a high thrust force. In such a case, it is desirable to have more flow to the inactive bearing than is normally provided.

It is a universal practice to have both active and inactive thrust bearings on a turbomachine rotor. In cases where turbomachines have equally-sized active and inactive, it is common practice to supply lubricant at a rate sufficient for both bearings.

OBJECT OF THE INVENTION

The object of the invention is to minimize the required total lubricant flow rate to the two thrust bearings, whether or not those thrust bearings are of equal size. In the case of two equally sized bearings, the total flow rate required is the minimum amount required for a single bearing. In the case of unequally sized bearings, the total flow rate required is that needed for the larger bearing.

SUMMARY OF THE INVENTION

The present invention is practiced upon a rotating shaft machine which includes a shaft mounted thrust collar positioned between an active thrust bearing and an inactive thrust bearing. A supply of lubrication fluid is sent to a distribution means which includes a spool valve. The position of the spool valve is determined by pilot fluid ports which communicate shaft position to the distribution means whereas the position of the spool valve determines lubricant flow through distribution ports of the distribution means which is connected to both the active and inactive thrust bearings. In this way, the position of the thrust collar relative to the active and inactive thrust bearings is transmitted to the lubrication distribution means whereupon the proper amount of lubrication is then flowed to the thrust bearings as required.

DETAILED DESCRIPTION OF THE INVENTION

Figure 1:
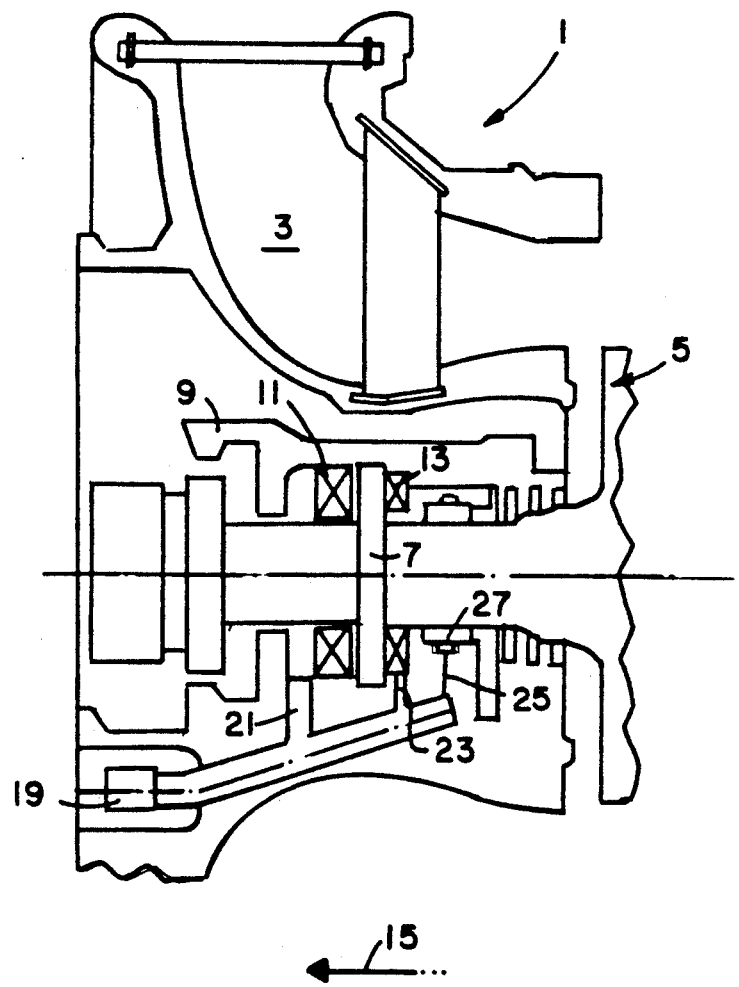
FIG. 1 is an elevation cross section view of a rotating shaft machine taken generally in the area of the thrust bearings.

A rotating machine intake end 1 is shown in FIG. 1 as a cross-section. The intake end 1 includes an intake annulus 3 which draws inlet gases into the machine. A rotor or rotating shaft 5, of which the end portion is shown, is positioned within the machine and includes a thrust collar 7 which is fixed to the rotating shaft. An inner casing 9 surrounds the end of the rotor and generally supports an active thrust bearing 11 and an inactive thrust bearing 13. The active and inactive thrust bearings are generally determined by the direction of thrust of the motive fluid which is indicated by the arrow 15. In FIG. 1, the active bearing 11 is larger than the inactive bearing 13 in order to absorb the thrust in the direction of the arrow 15.

Bearing lubrication is supplied through a bearing lubrication supply pipe 19 which provides lubrication to the active bearing 11 through pipe 21; to the inactive bearing 13 through pipe 23; and to the journal bearing 27 through the pipe 25. Note that each of the supply pipes 21, 23 or 25 may be sized differently or contain different size flow restrictors so as to supply the appropriate amount of bearing fluid to each respective bearing.

Figure 2:
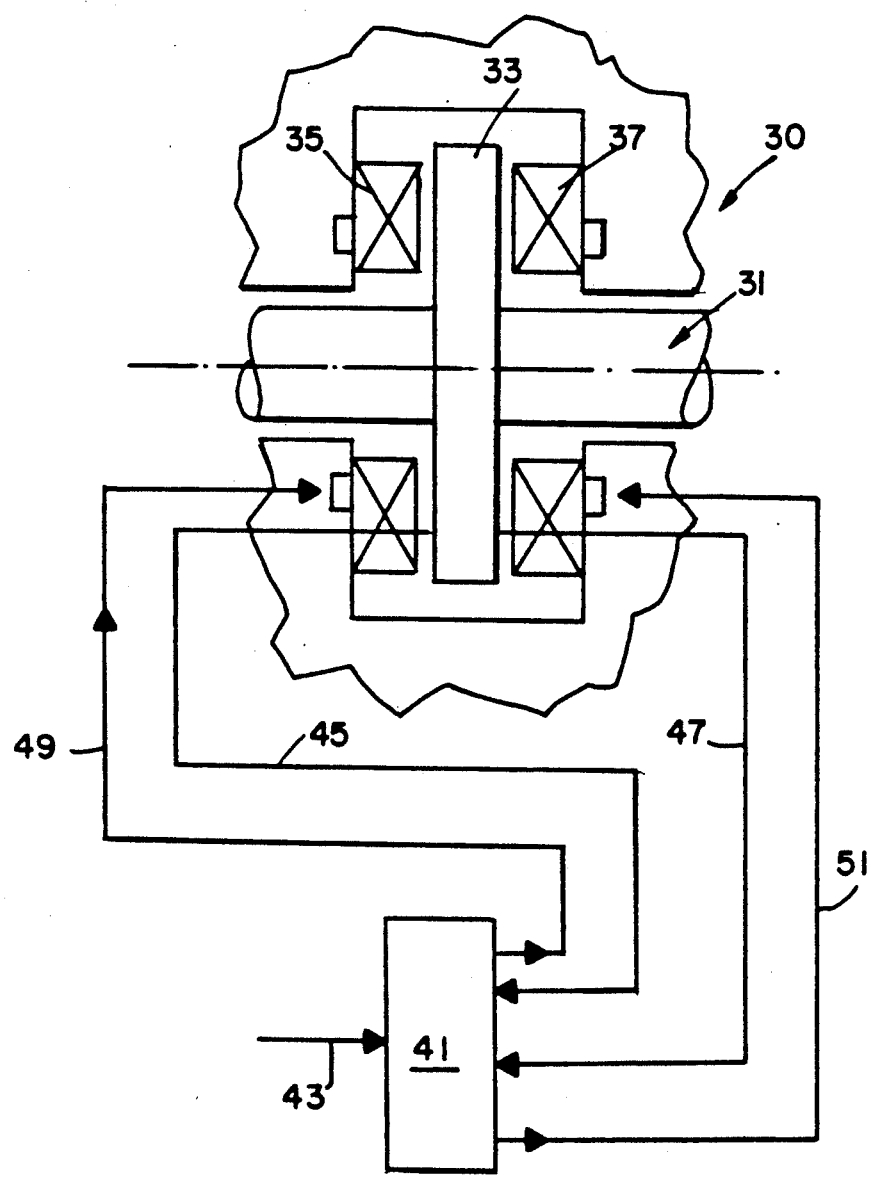
FIG. 2 is a schematic showing the present invention in combination with a thrust bearing.

FIG. 2 shows a thrust bearing lubrication system 30 in accordance with the present invention. A rotating shaft 31, of a rotating shaft machine (not shown) includes a thrust collar 33 which is made integral with the rotating shaft so as to be rotatable therewith. Active and inactive or first and second thrust bearings 35 and 37 each surround the rotating shaft and are depicted as being of equal size; although as previously explained, they could be of unequal size with the active bearing being larger than the inactive bearing. Thrust bearing construction is well known in the art and therefore does not need to be further explained here except to say that each bearing generally comprises an annular cage which supports a plurality of bearing pads. Thus the bearing itself is an annular structure comprised of a plurality of arcuate segments or bearing pads.

The thrust bearing lubrication system of the present invention includes a means for distributing the lubrication fluid 41 which further includes an input bearing lubrication fluid indicated by flow arrow 43. The means for distributing the lubrication fluid 41 is basically a manifold having inputs and outputs in accordance with the following description. Assuming a thrust direction in FIG. 2, the same as in FIG. 1; ie, right to left, the active thrust bearing is bearing 35 while the inactive thrust bearing is bearing 37. Each thrust bearing is monitored for lubrication film pressure between the face of the thrust bearing and the surface of the thrust collar. Thus the fluid film pressure at the active thrust bearing is monitored on line 45; and, the fluid film pressure at the inactive thrust bearing is monitored on line 47 both of which provide a kind of feedback or control signal to the lubrication fluid distribution means 41 as indicated by the arrows to provide a means for sensing the direction and position of axial thrust. There are also outbound fluid distribution lines 49 and 51, which connect the fluid distribution means 41 with the active bearing 35 and the inactive bearing 37 respectively.

Figure 3:
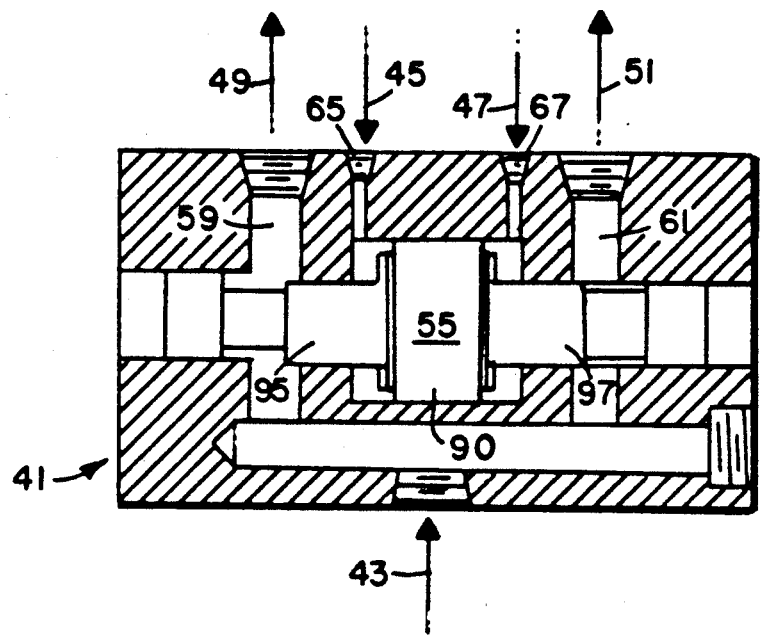
FIG. 3 is a cross section of a spool valve used in the distribution means of the present invention, when the valve is in neutral position.

FIG. 3 shows a cross-section of the fluid distribution means 41; and, in particular, shows a spool valve 55 which is slidable within the fluid distribution means. The fluid distribution means 41 further includes first and second fluid distribution ports 59 and 61 which are connected to the active and inactive outbound fluid distribution lines 49 and 51 respectively. The fluid distribution means 41 also includes first and second pilot ports 65 and 67 which are connected to the inbound active pressure line 45 and the passive pressure line 47 respectively.

Figure 5:
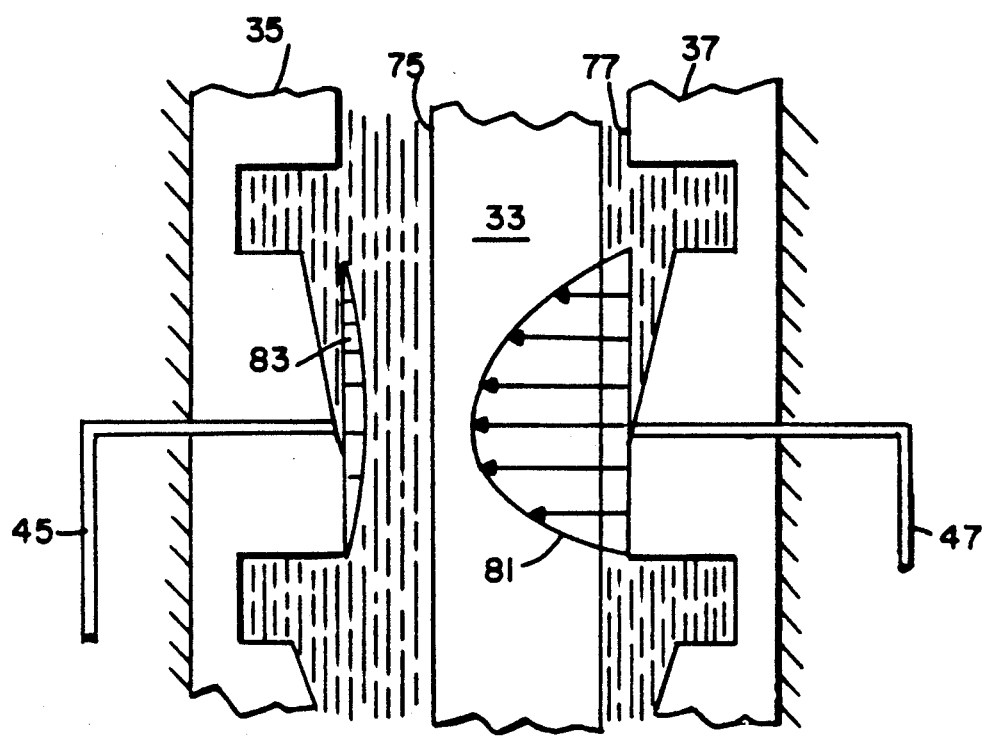
FIG. 5 is a load diagram illustrative of the forces present which are useful in determining the position of the rotating shaft.

FIG. 5 shows a pressure distribution curve taken between the active and inactive bearings 35 and 37 respectively with the active bearing face 75 of the thrust collar 33 and the inactive bearing face 77 of the thrust collar 33. It can be appreciated from the inactive pressure distribution diagram 81 that the closer the thrust collar is to the bearing, the greater the pressure sensed in the line 47. Likewise, the further the bearing from the thrust collar the less pressure that will be sensed in the normally active line 45 as demonstrated in pressure diagram 83.

Figure 4:
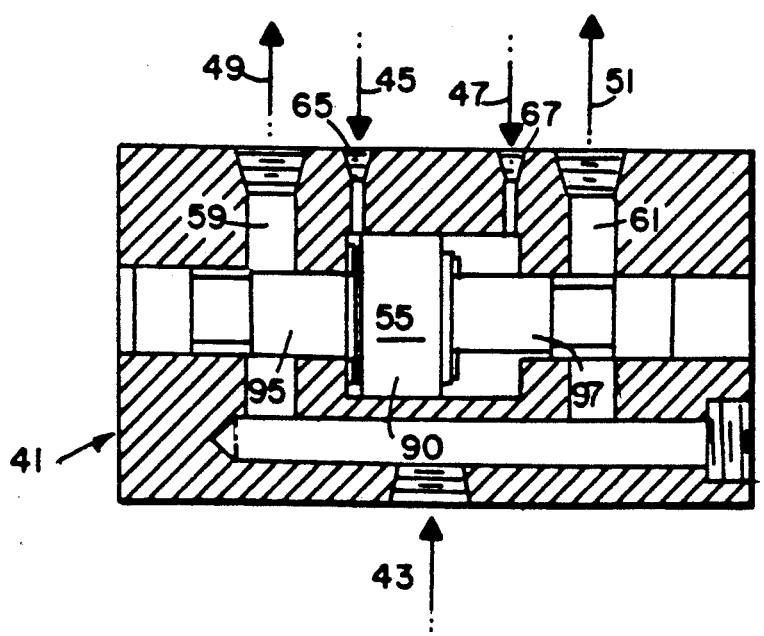
FIG. 4 is a cross section of a spool valve used in the distribution means of the present invention, when the valve is diverting more flow to one bearing than the other.

Referring back to FIG. 4, the total flow 43 into the lubrication fluid distribution means (manifold) is apportioned as a result of the pressures sensed at the respective bearings which, in turn, depends upon the axial position of the thrust collar and hence the rotor itself. In accordance with FIG. 5, the rotor has moved toward the inactive bearing thereby causing increased fluid pressure in line 47 which is connected into pilot pressure port 67. The increased pressure drives the spool valve 55 toward the left as shown, which uncovers fluid distribution port 61 to provide a greater share of the total fluid flow 43 into the fluid distribution line 51. The foregoing is accomplished by pressure bearing against the double sided piston 90 to provide a resultant force in one or the other direction which then moves the plugs 95 and 97 which extend in opposite directions from the piston to uncover either the active fluid distribution port 59 or the passive fluid distribution port 61 respectively.

Further in accordance with the invention, it is anticipated that where the two thrust bearings are of equal size, the total lubrication flow 43 to be apportioned will be equal to the maximum anticipated flow for one bearing. In the case where the two bearings are of unequal size, it is anticipated that the total lubrication flow 43 to be apportioned will be equal to the maximum flow anticipated for the larger bearing.

While there has been shown what is considered to be a preferred embodiment of the invention, it should be kept in mind that other embodiments will occur to those of ordinary skill in the art. For example, there are equivalent ways of determining the position of the thrust collar relative to the bearing surfaces other than by sensing pressures including the use of electronic load cells to provide a positioning signal to the spool valve within the lubrication fluid distribution means. It is intended to cover in the appended claims, all such modifications as will fall within the true spirit and scope of the claims.

What is claimed is:

1. An improved thrust bearing lubrication system for a machine having a rotating shaft; the rotating shaft having a thrust collar rotatable therewith; a first thrust bearing surrounding said relating shaft on one side of the thrust collar and a second thrust bearing surrounding said relating shaft on the other side of the thrust collar; a supply of lubrication fluid for the thrust bearings wherein the improvement comprises:

means for sensing the direction of axial thrust of said thrust collar relative to said first and second bearings;

means for distributing said lubrication fluid to either the first or second thrust bearing in response to the direction of shaft axial thrust to provide substantially all of the lubrication fluid flow to the thrust bearing toward which the axial thrust is directed;

which increased lubrication flows between said collar and said bearing.

2. The improved thrust bearing lubrication system recited in claim 1 wherein said means for sensing the direction of shaft axial thrust includes fluid lines from the regions between said one and other sides of said thrust collar and said distributing means.

3. The improved thrust bearing lubrication system recited in claim 1 wherein the distributing means includes a spool valve having first and second fluid distribution ports and first and second pilot fluid ports, the spool valve having a double sided piston slidable between the first and second pilot ports.

4. The improved thrust bearing lubrication system recited in claim 2 wherein the means for sensing the direction of axial thrust compares the pressure between said first thrust bearing and said thrust collar and a second fluid line between the second thrust bearing and said thrust collar.

5. The improved thrust bearing lubrication system recited in claim 1 wherein the distributing means includes a spool valve having first and second fluid distribution ports and first and second pilot fluid ports, the spool valve having a double sided piston slidable between the first and second pilot ports; and wherein there is a first fluid line connecting the first thrust bearing and the first pilot port and a second fluid line connecting the second thrust bearing and the second pilot port whereby fluid pressure at the first and second thrust bearings is communicated back to the fluid distributing means.

6. The improved thrust bearing lubrication system recited in claim 5 wherein the spool valve further includes first and second plugs connected to the double sided piston in opposite directions, each plug being slidable with the piston to cover or uncover its respective first and second fluid distribution port.

7. The improved thrust bearing lubrication system recited in claim 2 wherein the means for sensing the direction of axial thrust compares fluid pressure between said first thrust bearing and said one side of the thrust collar, with fluid pressure between said second thrust bearing and said other side of the thrust collar.

8. An improved thrust bearing lubrication system for a rotatable shaft in a machine having a thrust collar surrounding and rotatable with the shaft, first and second thrust bearings spaced from the thrust collar and surrounding the shaft and a lubricating supply delivering a preset amount of lubrication fluid adequate to supply the larger of the bearings under load comprising:
    pressure sensing means on either side of said thrust collar to sense the pressure between the thrust collar and the adjacent thrust bearing;
    a manifold having an inlet to which said preset amount of lubrication fluid is provided;
    said manifold having a first outlet connected to said first thrust bearing and a second outlet connected to said second thrust bearing;
    a spool valve slidable in said manifold in response to the pressure differential sensed by said pressure sensing means to uncover the outlet connected to the bearing which is experiencing increased pressure;
    whereby substantially all of said preset amount of said lubrication fluid is caused to flow through said bearing which is experiencing increased pressure.

9. The improved thrust bearing lubrication system of claim 8 wherein said first and second bearings include arcuate sections and the movement of said thrust collar toward one of said bearings increases the pressure of the lubricating fluid flowing between said one of said bearings and sad thrust collar.

10. The improved thrust bearing lubrication system of claim 9 wherein said pressure sensing means includes first and second pilot ports in said manifold, and said spool valve includes a piston, wherein said first and second pilot ports are located on either side of said piston.

11. A thrust bearing lubrication system for a machine having a rotating shaft, a thrust collar mounted on said shaft for rotation therewith; a first annular thrust bearing surrounding the shaft on one side of the thrust collar and a second annular thrust bearing surrounding the shaft on the other side of the thrust collar, said lubrication system comprising a supply of lubrication fluid; means for distributing said lubrication fluid including a spool valve comprising a double sided piston, first and second valve plugs extending in opposite directions from either side of said double sided piston, first and second fluid distribution ports located on either side of said double sided piston and in direct fluid communication with said first and second annular thrust bearings, respectively, wherein said first and second valve plugs are adapted to cover and uncover said first and second fluid distribution ports via movement of said spool valve to thereby control flow of lubricant through said first and second distribution ports, respectively; and first and second pilot fluid ports located on either side of and adjacent said double sided piston and also in direct communication with the first and second thrust bearings, respectively; said first and second pilot fluid ports adapted to introduce lubricant on either side of said double sided piston to thereby control movement of said spool valve; wherein san increase in bearing pressure in either bearing will cause fluid to flow through one or the other of said pilot fluid ports such that said double sided piston will move in one or the other directions so that one or the other fluid distribution ports is covered or uncovered to apportion the flow of lubrication fluid to the bearing experiencing the increased bearing pressure.

12. The thrust bearing lubrication system recited in claim 11 wherein the thrust bearings are of equal size and the total flow of lubrication fluid is the maximum anticipated amount of lubrication fluid required for one bearing.

13. The thrust bearing lubrication system recited in claim 11 wherein one thrust bearing is larger than the other thrust bearing and the total flow of lubrication fluid is the maximum anticipated amount of lubrication fluid required for the larger bearing.

14. An improved thrust bearing lubrication system for a machine having a rotating shaft; a thrust collar mounted on the shaft; a pair of annular thrust bearings one of either side of the thrust collar and surrounding the shaft, and a lubrication supply pipe for supplying lubricant between a face of each thrust bearing and an adjacent surface of the thrust collar, the thrust bearing lubrication system comprising means for minimizing total lubricant flow rate to said annular thrust bearings including
    fluid means for sensing lubrication film pressure at said face of each thrust bearing; and
    valve means for automatically distributing lubricant to said thrust bearings as a function of the sensed pressure at said face of each thrust bearing, wherein said fluid sensing means and said valve means are in direct fluid communications.

15. An improved thrust bearing lubrication system for a machine having a rotating shaft, a thrust collar on said shaft and rotatable therewith, a first thrust bearing surrounding said shaft on a first side of the collar and a second thrust bearing surrounding said shaft on a second side of the thrust collar, the lubrication system comprising a supply of lubrication fluid for the first and second thrust bearings; first fluid means for sensing the direction of axial thrust of said thrust collar relative to the first and second bearings as a direct function of lubrication film pressures between said first and second bearings and said first and second sides of the thrust collar; and second fluid means for distributing said lubrication fluid to either the first or second thrust bearing depending upon the sensed direction of axial thrust to provide increased lubrication fluid flow to the thrust bearing toward which the axial thrust is directed, said first and second fluid means being in direct fluid communication with each other.

16. The improved thrust bearing lubrication system recited in claim 15 wherein the distributing means includes a spool valve having first and second fluid distribution port and first and second pilot fluid ports, the spool valve having a double sided piston slidable between the first and second pilot ports.

17. An improved thrust bearing lubrication supply system for a rotatable shaft in a machine having a thrust collar surrounding and rotatable with the shaft; first and second thrust bearings spaced on either side of the thrust collar and surrounding the shaft; the lubrication supply system comprising:
 fluid pressure sensing means on either side of said thrust collar to sense directly lubrication film pressure between the thrust collar and the adjacent first and second thrust bearings, respectively;
 a manifold having an inlet to which a preset amount of lubrication fluid is provided;
 said manifold having a first outlet connected to said first thrust bearing, a second outlet connected to said second thrust bearing; and
 a spool valve slidable in said manifold in direct response to pressure differential sensed by said fluid pressure sensing means to uncover the outlet connected to the one of said first and second thrust bearings which is experiencing increased pressure, so that increased lubrication fluid is caused to flow to said one of said first and second thrust bearings.

18. The improved thrust bearing lubrication system of claim 17 wherein said spool valve includes a piston, wherein said first and second pilot ports are located on either side of said piston.

* * * * *